THEODORE HUDNUT.

Improvement in Hominy Mills.

No. 5,520. Reissued August 5, 1873.

Witnesses.

E. Wolff.

Francis McArdle

Inventor.

Thed. Hudnut.

PER Munn & Co

Attorneys.

AM. PHOTO-LITHOGRAPHIC CO. N.Y. (OSBORNE'S PROCESS.)

UNITED STATES PATENT OFFICE.

THEODORE HUDNUT, OF TERRE HAUTE, INDIANA.

IMPROVEMENT IN HOMINY-MILLS.

Specification forming part of Letters Patent No. 122,172, dated December 26, 1871; reissue No. 5,520, dated August 5, 1873; application filed March 22, 1873.

*To all whom it may concern:*

Be it known that I, THEODORE HUDNUT, of Terre Haute, in the county of Vigo and State of Indiana, have invented a new and Improved Hominy-Mill Cylinder, of which the following is a specification:

My invention relates to improvements in the construction of the cutter-carrying cylinders or shafts used in hominy-mills, and mode of attaching the cutters thereto, which said improvements I will first describe, and then indicate more particularly in the claim.

Figure 1:
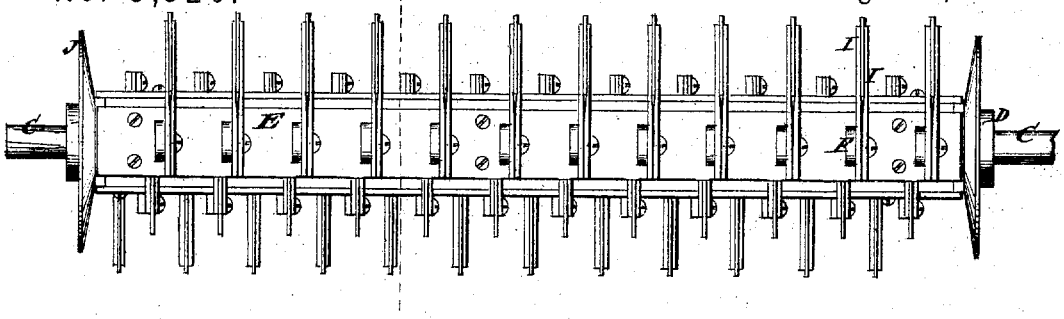
Figure 2:
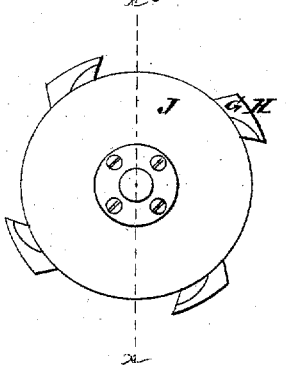
Figure 3:
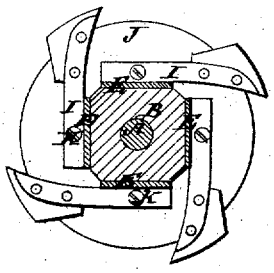
Figure 4:
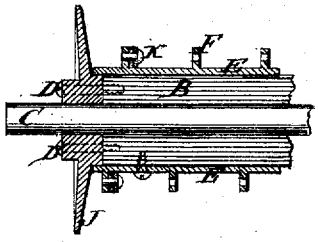

Figure 1 is a side elevation of the cutter-carrying shaft, the cutters, and the means employed for connecting them to said shaft or cylinder. Fig. 2 is an end elevation. Fig. 3 is a cross-section; and Fig. 4 is a longitudinal section taken on the line *x x* of Fig. 2.

Similar letters of reference indicate corresponding parts.

I take a long iron or steel shaft, A, of suitable length and size for the purpose, and fit the wood shaft B upon it, said shaft being as much shorter than the iron shaft as is necessary to have the latter project at each end to form the journals C, and receive the gearing for turning it. The said wood shaft is secured to the shaft A by means of the collars D, keyed to the latter and bolted to the shaft B, and it has four or more plain sides, according to the number of rows of cutters it is to carry, each side having a metal plate, E, attached to it. These metal plates have lugs F attached to them at intervals of the same distance apart it is required to have the cutters, the said lugs being arranged lengthwise transversely of the plates, and those of one row are placed a short distance laterally from those of the next row either way, in such order that they form broken spiral rows around the shaft.

The cutters, which consist of steel blades G with the inner point of the cutting-edges H, projecting over a true circle struck from the axis of the shaft, are fitted between two curved holders, I, and secured by bolts or screws, and these holders are bolted to the lugs F on the plates, being laid across said plates, as clearly shown, so that they are confined against turning on the bolts K by said plates. These holders constitute part of the cutters, and act, by reason of their curved shape, very effectively, in connection with the stationary cutters of the case, in cutting or breaking the grain. They may be bolted directly to the shaft instead of the lugs of plate E, but I prefer to bolt them to the plates. The collars D are provided with broad plano-convex disks J, which keep the grain away from the bearings and in contact with the cutters. This arrangement of the arms or holders of the cutters permits of their being readily removed for repairing or removing the cutters.

Having thus described my invention, I claim as new, and desire to secure by Letters Patent—

1. The combination of the shaft B, plates E, lugs F, arms I, blades G, and the collars D, all substantially as specified.

2. The combination of the blades G, lugs F, and arms I for securing the blades to the shaft and plates, substantially as specified.

3. The holders I for the blades G, having the curved form described.

4. Cutters for a hominy-mill, consisting of curved holders I and blades G, combined and arranged relatively to the shaft, as specified.

THEODORE HUDNUT.

Witnesses:

ISAAC N. ASH,

BEN G. HUDNUT.